(12) United States Patent
Andersson

(10) Patent No.: US 11,679,835 B2
(45) Date of Patent: Jun. 20, 2023

(54) VEHICLE HAVING AT LEAST ONE HANDLEBAR, ESPECIALLY MOTORCYCLE, WITH A SAFETY DEVICE

(71) Applicant: AUTOLIV DEVELOPMENT AB, Vargarda (SE)

(72) Inventor: Mikael Andersson, Alingsas (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/760,193

(22) PCT Filed: Feb. 2, 2021

(86) PCT No.: PCT/EP2021/052346
§ 371 (c)(1),
(2) Date: Aug. 5, 2022

(87) PCT Pub. No.: WO2021/156216
PCT Pub. Date: Aug. 12, 2021

(65) Prior Publication Data
US 2023/0071625 A1    Mar. 9, 2023

(30) Foreign Application Priority Data
Feb. 7, 2020   (DE) ............. 10 2020 103 208.0

(51) Int. Cl.
*B62J 27/00*       (2020.01)
*B62K 25/04*      (2006.01)
*B62K 21/12*      (2006.01)

(52) U.S. Cl.
CPC ............ *B62J 27/00* (2013.01); *B62K 21/12* (2013.01); *B62K 25/04* (2013.01)

(58) Field of Classification Search
CPC ........ B62K 25/04; B62K 25/18; B62K 25/24; B62J 27/00; B62J 27/30; B60R 2021/0088
See application file for complete search history.

(56) References Cited

U.S. PATENT DOCUMENTS

| 4,447,069 A | 5/1984 | Winiecki |
| 2003/0218320 A1 | 11/2003 | Kuroe et al. |
| 2008/0217090 A1 * | 9/2008 | Bodkin ................. B62K 21/12 180/271 |

FOREIGN PATENT DOCUMENTS

| DE | 29515849 U1 | 11/1995 | |
| DE | 19821134 A1 | 12/1999 | |
| DE | 102005037623 B4 * | 10/2010 | ............. B60R 21/04 |
| DE | 102012203643 A1 * | 9/2013 | ............. B62J 27/00 |

(Continued)

*Primary Examiner* — Daniel D Yabut
(74) *Attorney, Agent, or Firm* — Dickinson Wright PLLC

(57) ABSTRACT

The invention relates to vehicles having at least one handlebar, especially to motorcycles. It turned out that during a frontal crash the handlebar of the motorcycle itself constitutes a threat for the cyclist because in case of such a frontal crash this handlebar can constitute a basically non-movable barrier for the cyclist and the risk is high that the abdomen of the cyclist hits this barrier. So, at least one weakening—or destruction device is provided. This weakening—or destruction device is able to be directly or indirectly triggered by a crash sensor system and is able to weaken or destroy the at least one handlebar or to weaken or destroy the connection of the at least one handlebar to the fork of the motorcycle when triggered.

9 Claims, 3 Drawing Sheets

(56) References Cited

FOREIGN PATENT DOCUMENTS

Figure 1:
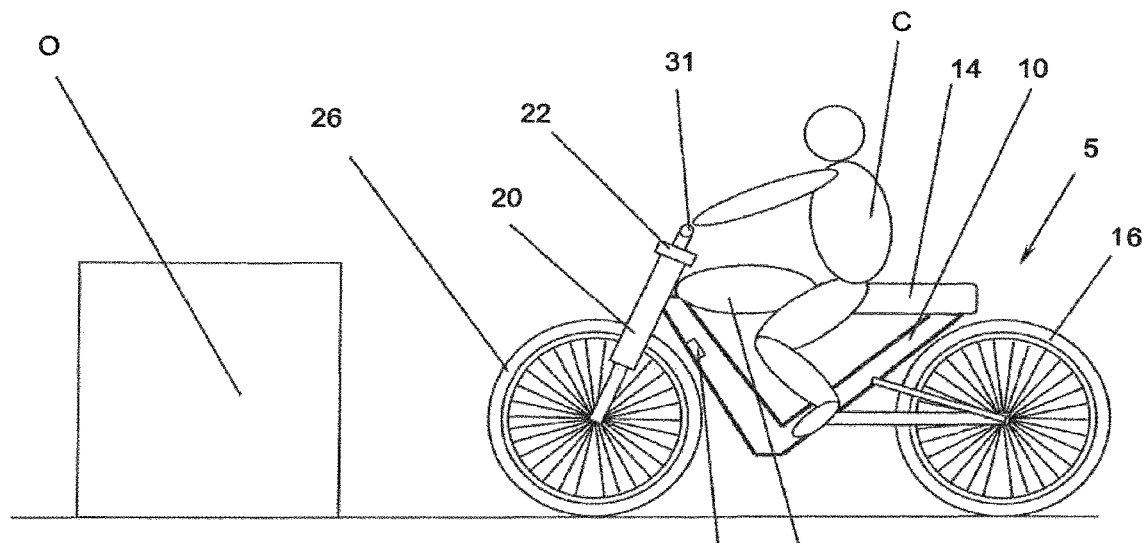

| DE | 102012203645 A1 | * | 9/2013 | ............. | B62J 27/00 |
|----|-----------------|---|--------|---|---|
| DE | 102019206719 A1 | * | 11/2020 | | |
| EP | 1607317 A2 | | 12/2005 | | |
| EP | 2384960 A1 | | 11/2011 | | |
| JP | 2006 001499 A | | 1/2006 | | |

* cited by examiner

VEHICLE HAVING AT LEAST ONE HANDLEBAR, ESPECIALLY MOTORCYCLE, WITH A SAFETY DEVICE

The invention relates to a vehicle having at least one handlebar according to the preamble of claim 1.

The invention especially relates to motorcycles, but can also be applied to similar vehicles like bicycles, e-bicycles, trikes and quads. But, for the sake of linguistics simplicity reference is now made to motorcycles only. It will be easy to see that the invention can also be applied to similar vehicles having at least one handle bar.

The above specified vehicles always comprise a first part which carries at least one rear wheel at least indirectly and a second part swiveling connected to the first part and carrying at least one front wheel. In case of a motorcycle the first part is the frame to which the rear wheel is usually connected via a swing arm and the second part is the fork. Commonly a handlebar having two sections or two separate handlebars is/are rigidly attached to the fork, usually to its upper fork bridge or directly to the fork legs. For the sake of linguistic clarity, those two cases are in the following referred to as "the handlebar" or "the at least one handlebar".

While passive safety systems have largely been improved in the field of cars by the use of airbags and seatbelt systems, the passive safety in the field of motorcycles is still only weakly developed and so it is the object of the present invention to provide a new passive safety system for a vehicle having at least one handlebar.

This task is solved by a vehicle having the features of claim 1.

The invention provides a concept which can help to significantly increase the safety of a cyclist during a basically frontal crash.

If the motorcycle crashes frontally into an obstacle (which is often a car), basically only the front wheel and eventually a part of the fork deforms whereas its frame remains relatively un-deformed. Because the mass of the obstacle is often much larger than the mass of the motorcycle, the motorcycle comes to complete stop very quickly. Due to the principles of inertia the cyclist basically keeps his/her original velocity and leaves the motorcycle over the handle bar. Often, the obstacle is not very high such that the cyclist has the chance to "fly over" this obstacle such that his chances to survive and not to be injured too heavily are in a relevant range.

It turned out that especially in the above describes scenario the at least one handlebar of the motorcycle itself constitutes a relevant source of potential injury, since it is likely that a body part of the cyclist—especially his/her abdomen—hits the handle bar when "flying over it". The handle bar cannot move because it is rigidly connected to the fork which in turn is stuck in the obstacle.

So, according to the invention, at least one weakening- or destruction device is provided that it is directly or indirectly triggered by a crash sensor system and that weakens or destroys the at least one handlebar or weakens or destroys the connection of the at least one handle bar to the part of the vehicle to which it is connected, usually the connection to the fork.

At the time of the frontal accident the handle bar is of no use for the cyclist because it is impossible for him/her to control the motorcycle with this handle bar. So, the handle bar is exclusively a potential threat for the cyclist and so it is in any case good to remove or weaken it such that it cannot exercise a force or at least not a high force to a body part of the cyclist.

Since relatively high forces are needed, the weakening- or destruction device preferably comprises a pyrotechnic element.

In most cases handlebars are in form of tubes, meaning that they have a jacket enclosing a hollow space.

In one embodiment, each pyrotechnic element is in form of a pyrotechnic cord being located inside the hollow space. The ignition of the pyrotechnic cord can for example crack a connection between the tube and a screw, bolt, or the like. In this case, each weakening- or destruction device can exclusively be comprised of a pyrotechnic cord.

In another embodiment, each weakening- or destruction device can comprise a pyrotechnic actuator and a cutter being driven by this pyrotechnic actuator. In this case the pyrotechnic actuator and the cutter are located outside the tube of the handlebar and the cutter cuts through a section of the jacket of the tube when driven by the pyrotechnic actuator. This significantly weakens the structure of the tube such that it easily bents or breaks when a radial force is applied to it. Preferably, the weakening- or destruction device is located between the handlebar and the seating position of the cyclist.

Most often it will be preferred to provide two weakening- or destruction devices, one for each handlebar in the case of two distinct handlebars, one for the left section and one for the right section of a joint handlebar in the case of a joint handlebar.

In the case of a joint handlebar it would in principle also be possible to provide only one weakening- or destruction device.

Figure 2:
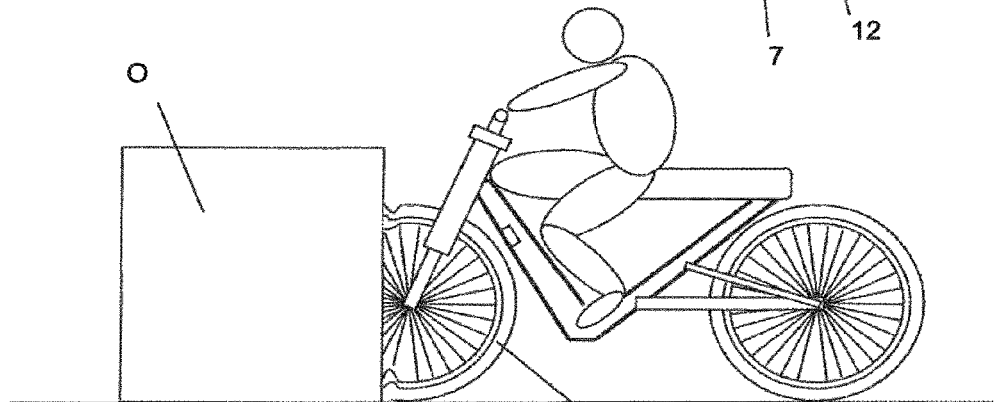
Figure 3:
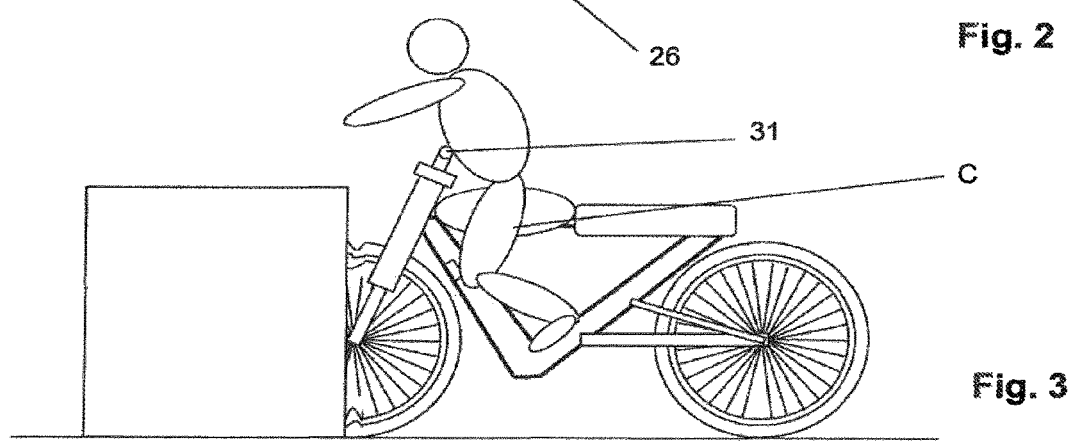
Figure 4:
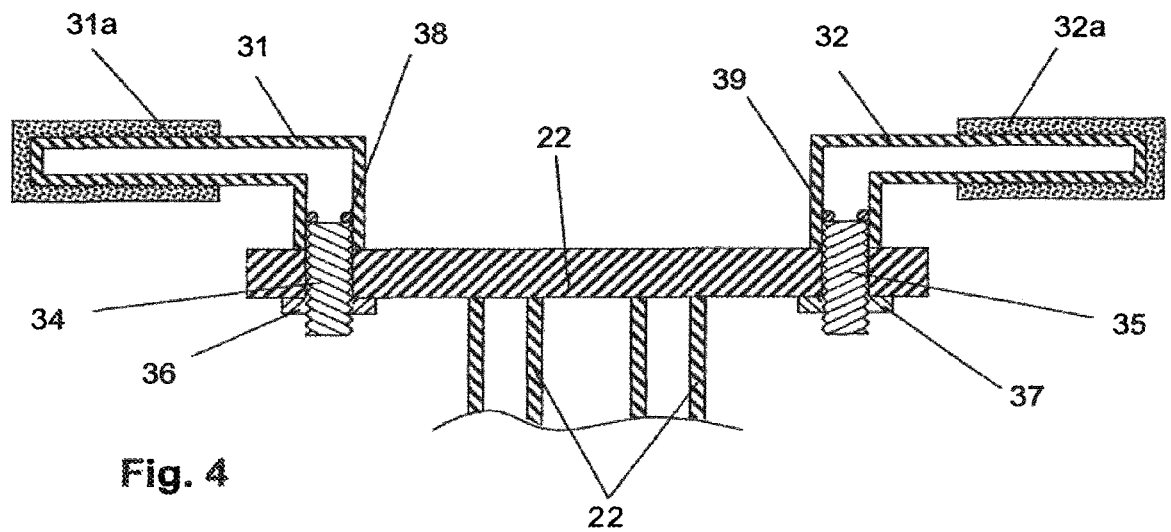
Figure 5:
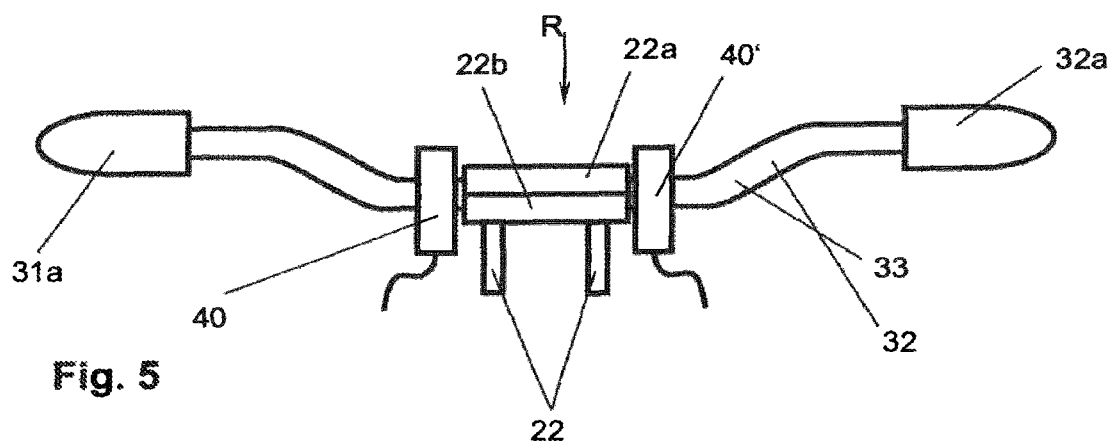

The invention will now be described in detail by means of preferred embodiments. The figures show:

FIG. 1 a very systematic representation of a motorcycle driving towards an obstacle, FIG. 2 what is shown in FIG. 1 after the bicycle has hit the obstacle, FIG. 3 what is shown in FIG. 2 at a slightly later stage, FIG. 4 a first embodiment of the invention in a schematic sectional representation of an upper fork bridge and two handle bars attached to this upper fork bridge, FIG. 5 a second embodiment of the invention in a plan view basically from the driver side, FIG. 6 what is shown in FIG. 5 in a plan view from direction R (from the top) in FIG. 5, and, FIG. 7 a sectional view taken along plane A-A in FIG. 6 in a more detailed representation.

FIG. 1 shows schematically a motorcycle 5 driving towards an obstacle O. As every motorcycle this motorcycle 5 comprises a frame 10 forming the first part of the motorcycle and the fork 20 being connected to the frame in a swilling manner. The fork 20 constitutes the second part of the motorcycle within the definitions chosen here. A rear wheel 16 is held by a swing arm attached to frame 10 such that the rear wheel 16 is indirectly carried by the frame 10. In a known manner the fork 20 carries the front wheel 26. An upper fork bridge constitutes the upper end of the fork 20. The lower fork bridge and the connection of the fork to the steering head of the frame are not shown, because these parts are not of interest here. In this first embodiment, two handlebars (here the first (left) handlebar 31 can be seen) are attached to the upper fork bridge 22. A cyclist C sits on a bench 14 attached to the frame 10 and holds the handle grips being attached to the handle bars with both hands.

A crash sensor system is provided. This crash sensor system can for example comprise an accelerometer 7 and an electronic processing device, for example the ECU of the motorcycle. Of course, a separate electronic processing unit for the accelerometer 7 could also be provided. In principle, the crash sensor system could also be solely comprised of a mechanical inertia sensor being mounted to the frame. The term "crash sensor system" is to be understood in a way that covers all devices or systems that are able to detect a crash, especially a frontal crash.

When the motorcycle 5 runs into an obstacle O (which can for example be a car having many times the mass of the motorcycle 5) the front wheel 26 deforms easily and/or the fork 20 tilts relative to the frame (FIG. 2).

As soon as the fork hits the obstacle O, the motorcycle comes to very sudden halt leading to a movement of the cyclist over the handle bars. This is shown in FIG. 3. If the handle bars remain connected to the fork 20, at least one of the handle bars can be hit by the cyclist, especially his/her abdominal area which could lead to heavy injures due to the high relative velocity of the cyclist relative to this handlebar which cannot substantially move because the fork is "held" by the object O.

So, according to the invention, the connections of the handlebars to the fork 20 (here: the upper fork bridge 22) are weakened or destroyed when the crash senso system senses a frontal crash. FIG. 1 shows the upper fork bridge 22 and the handle bars 31, 32 of for motorcycle shown in FIGS. 1 to 3 in a schematic cross sectional view. In the embodiment shown these two handle bars 31, 32 are screwed to the upper fork bridge 22 by mean of threaded bolts 34, 35 and nuts 36, 37. The main bodies of the handle bars 31, 32 are made of hollow tubes (as is usual) and the threaded bolts 34, 35 are for example welded to the inside of those hollow tubes. At least one pyrotechnic cord 38, 39 is provided on the inside of each handle bar, basically on top the respective threaded bolt.

When the crash sensor system detects a frontal crash, the pyrotechnic cords 38, 39 are ignited and destroy the threaded bolts 34, 35 or their connections to the tubes of the handle bars 31, 32. So the handle bars 31, 32 are detached from the upper fork head 22.

The pyrotechnic cords 38, 38 can also be arranged to cut or only weaken the handle bars 31, 32.

In another embodiment, the at least one pyrotechnic cord 38, 39 can also be positioned outside the handle bars 31, 32 in at least one specific housing (not shown in the drawings) which would be clamped onto the handle bars 31, 32.

The same principal can of course apply to other connection types between handle bars and the fork.

Figure 6:
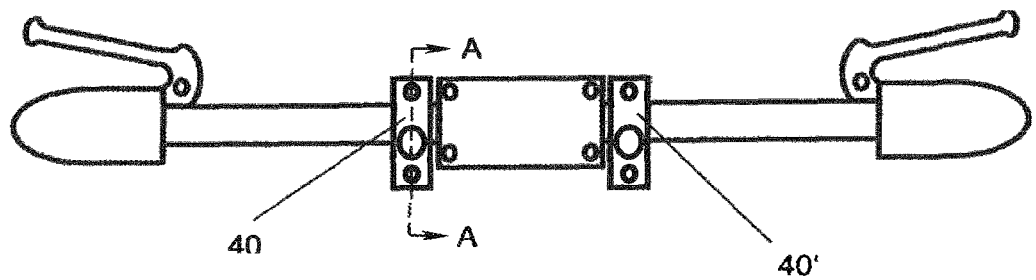
Figure 7:
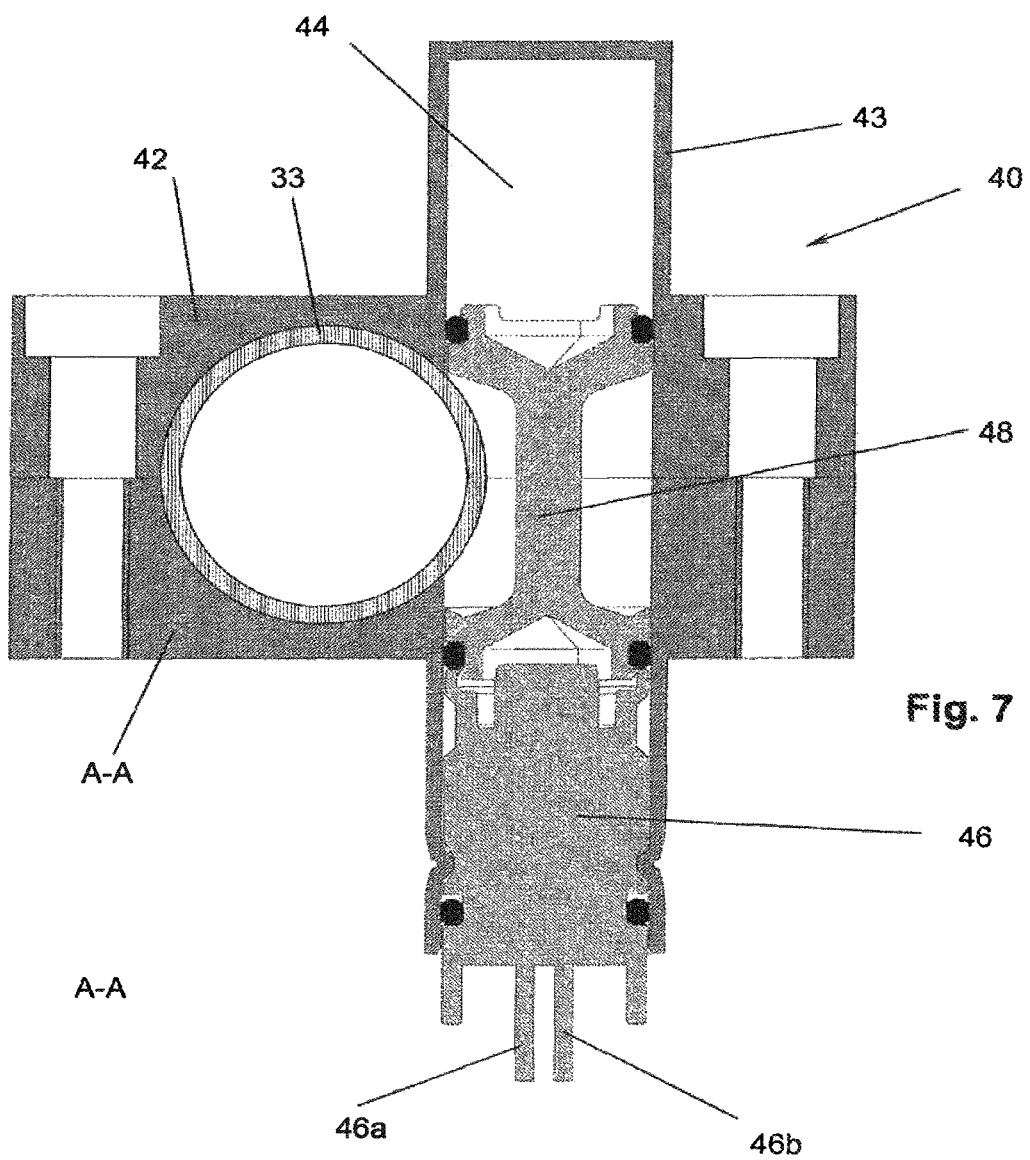

FIGS. 5 and 6 show a second embodiment. Here, a joint handlebar 33 is provided with the ends of this joint handlebar 33 carrying the handle grips 31a, 32a. A middle portion of this joint handle bar 33 is held inside the upper fork bridge 22 in a clamped manner. Therefore, the upper fork bridge 22 comprises an upper part 22a and a lower part 22b. In this case it would be complicated to completely destroy the connection of the handle bar, or at least its left and right sections 33a, 33b, to the upper fork bridge 22, so only a weakening of these two sections is chosen. For this reason, two pyrotechnic weakening devices 40, 40' are located onto the joint handle bar 33 left and right to the upper fork bridge 22 and preferably in close proximity to the upper fork bridge 22. These two weakening devices 40, 40' are identically constructed, so reference is only made to one of those pyrotechnic weakening devices namely the pyrotechnic device 40 on the left side:

As can especially be seen from FIG. 7 this pyrotechnic weakening device 40 comprises a housing 42 being clamped onto the joint handle bar 33 and comprising a pyrotechnic actuator 46 and a cutter 48 being driven by this pyrotechnic actuator 46. On the side of the cutter 48 remote from the pyrotechnic actuator 46 the chamber has a protrusion 43 enclosing a chamber 44 such that the cutter 48 can perform a short linear motion when driven by the ignited pyrotechnic actuator 46 without leaving the housing 42. By this linear movement the cutter 48 cuts a section of the cylinder wall of the handle bar which leads to a significant weakening of the handle bar (here its left section 33a), such that when the cyclist hits this section of handle bar it is easily bent away. As can especially be seen in FIG. 6, the cutter 48 and the pyrotechnic actuator 46 are located rear the handlebar, meaning between the handle bar and the normal seating position of the cyclist. This is important since the cyclist of course hits the handle bar from the rear.

LIST OF REFERENCE NUMBERS 5 motorcycle
7 accelerometer
10 first part (frame)
12 tank
14 bench
16 rear wheel
20 second part (fork)
22 upper fork bridge
22a upper part
22b lower part
26 front wheel
31 first handle bar
31a first handle grip
32 second handle bar
32a second handle grip
33 joint handle bar
34, 35 screw
36, 37 nut
38, 39 pyrotechnic cord
40 pyrotechnic weakening device
42 housing
43 chamber part
44 chamber
46 pyrotechnic actuator
48 cutter
C cyclist
O obstacle

The invention claimed is:

1. A vehicle, comprising:
 a first part carrying at least one rear wheel at least indirectly;
 a second part being attached to the first part in a swiveling manner and carrying at least one front wheel;
 at least one handlebar being rigidly connected to the second part;
 a crash sensor system;
 wherein at least one weakening- or destruction device is provided, said weakening—or destruction device able to be directly or indirectly triggered by the crash sensor system and able to weaken or destroy the at least one handlebar or able to weaken or destroy the connection of the at least one handlebar to the second part when triggered.

2. The vehicle according to claim 1, wherein the weakening—or destruction device comprises a pyrotechnic element.

3. The vehicle according to claim 1, wherein exactly one handlebar carrying two handle grips is provided.

4. The vehicle according to claim 3, wherein only one weakening—or destruction device is provided.

5. The vehicle according to claim 1, wherein a left handlebar and a right handlebar are provided, each carrying one handle grip.

6. The vehicle according to claim 1, wherein two weakening—or destruction devices are provided, one being allocated to the left handlebar/left section of the handlebar, the other being allocated to the right handlebar/right section of the handlebar.

7. The vehicle according to claim 1, wherein the at least one weakening—or destruction device comprises a pyrotechnic cord.

8. The vehicle according to claim 1, wherein the weakening—or destruction device comprises a cutter acting on the at least one handlebar when the weakening—or destruction device is triggered.

9. The vehicle according to claim 1, wherein the vehicle is a motorcycle and the second part is the fork of the motorcycle.

\* \* \* \* \*